(12) United States Patent
Lee

(10) Patent No.: US 6,588,770 B1
(45) Date of Patent: Jul. 8, 2003

(54) AUTOMOTIVE MINIMAL-TURNING RADIUS CONTROL SYSTEM

(75) Inventor: Un-Koo Lee, Kyungki-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/473,581

(22) Filed: Dec. 28, 1999

(30) Foreign Application Priority Data

Jul. 14, 1999 (KR) ............................................. 99-28338

(51) Int. Cl.[7] ................................................ B60G 17/01
(52) U.S. Cl. ................................................ 280/5.52
(58) Field of Search ....................... 280/5.52, 5.521, 280/98, 93.502, 93.51, 93.514

(56) References Cited

U.S. PATENT DOCUMENTS

| 4,598,788 | A | | 7/1986 | Serizawa et al. | 180/140 |
|---|---|---|---|---|---|
| 4,630,701 | A | | 12/1986 | Venetjoki | 180/209 |
| 4,700,972 | A | * | 10/1987 | Young | 280/5.508 |
| 4,828,283 | A | | 5/1989 | Ishii et al. | 280/91 |
| 5,069,302 | A | * | 12/1991 | Kageyama | 180/197 |
| 5,975,573 | A | | 11/1999 | Belleau | 280/771 |
| 6,293,561 | B1 | * | 9/2001 | Goetzen et al. | 280/5.52 |

* cited by examiner

*Primary Examiner*—Paul N. Dickson
*Assistant Examiner*—Faye M. Fleming
(74) *Attorney, Agent, or Firm*—Christie, Parker & Hale, LLP

(57) ABSTRACT

An automotive minimal turning radius control system is provided which includes a sensor for sensing a height of the vehicle body, a pair of actuators which are controlled by an ECU according to the sensed height of the vehicle, and a pair of steering stroke adjusters which are actuated by the actuators for adjusting steering stroke.

21 Claims, 6 Drawing Sheets

AUTOMOTIVE MINIMAL-TURNING RADIUS CONTROL SYSTEM

BACKGROUND OF THE INVENTION (a) Field of the Invention

The present invention relates to a turning radius system for an automobile, and, more particularly, to an improved minimal turning radius control system capable of optimally controlling a minimal turning radius according to a load of vehicle.

(b) Description of the Related Art

When a vehicle having a large turning radius makes a U-turn on a limited-width road, the driver needs to perform several steering operations to complete the U-turn, which occasionally causes traffic congestion as well as being bothersome to the driver.

Nowadays, as the overall lengths of oversize passenger cars increase, the turning radius problem is becoming more serious.

This turning radius problem appears particularly in front-engine front wheel drive vehicles in which the engine is mounted transversely because the engine in such vehicles occupies much space in both the left and right hand sides the of the vehicle engine compartment. With this engine-mounting configuration, it is difficult to secure enough space for the steering of the front wheels.

Generally, the steering stroke in a steering gear box is set in such a way that when a vehicle having tire chains on the front wheels is operating in a worst case condition, a minimal gap between the a wheel and side member and other elements is maintained.

In such a steering gear box setting, when common width tires without chains are mounted to the vehicle, excessive space exists between the wheel and vehicle body such that steering angles of the wheel are wasted.

Although the turning radius in a vehicle, especially in higher end passenger cars, is an important element influencing the commodity value of the vehicle, it is likely to be not appropriately considered during the designing the vehicle.

SUMMARY OF THE INVENTION

The present invention has been made in an effort to solve the above problems of the prior art.

It is an object of the present invention to provide a minimal turning radius control system capable of optimally minimizing the turning radius of a vehicle according to a vehicle's load detected at the start of travel for when the vehicle makes a U-turn.

To achieve the above object, the minimum turning radius control system comprises a sensing means for sensing a height of a vehicle body, a pair of actuators which is controlled by an electronic control unit (ECU) according to a height of the vehicle, and a pair of steering stroke adjusting means which are actuated by actuators for adjusting steering stroke.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
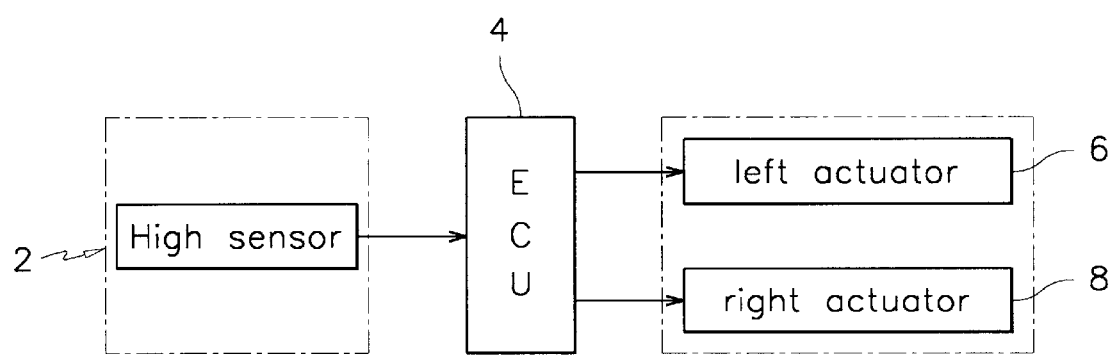
FIG. 1 is a block diagram showing a minimum turning radius control system according to the present invention.

FIG. 1 is a block diagram showing a minimal turning radius control system of the present invention.

As shown in FIG. 1, the minimal turning radius control system includes a sensing means 2, electric control unit (ECU) 4, and actuating means of left and right actuators 6 and 8. The sensing means 2 comprises a high sensor, which detects vehicle body height in response to load changes and responsively produces and sends electric signals to the ECU 4. The ECU 4 calculates the height of the vehicle on the basis of the parameters detected by the sensing means 2 and estimates wheel bounce according to the load condition, and then sends control signals to left and right actuators 6 and 8 such that the actuators 6 and 8 on a steering linkage adjust steering stroke. The actuators are motors.

The sensing means 2 is not limited to the high sensor disclosed in the preferred embodiment but can comprise various other sensing means which can detect the vehicle's load, and occasionally a manual switch position which is set by the driver can be employed.

Such a manual switch produces and sends an electric signal to the ECU 4 such that the ECU 4 determines the height of the vehicle on the basis of the switch signal.

The left and right actuators 6 and 8, which operate on the basis of the control signal from the ECU 4, actuate steering stroke adjusting means 3 at both ends of the steering gear box 20.

Figure 2:
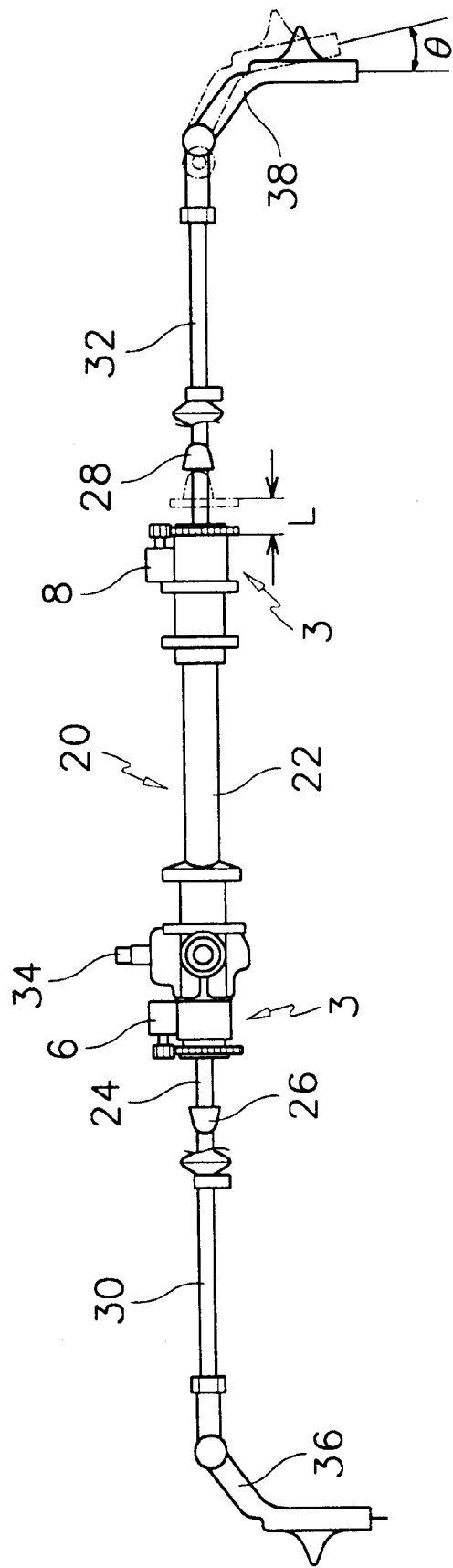
FIG. 2 is a front view showing a steering linkage according to a first preferred embodiment of the present invention.

With reference to FIG. 2, the steering stroke adjusting means 3 are symmetrically provided at the ends of the steering gear box 20. The steering gear box 20 comprises a cylinder 22, and a rack 24 is inserted into the cylinder 22 and respectively connected to tie rods 30 and 32 at their both ends by means of ball joints 26 and 28. The tie roads 30 and 32 in turn are connected to the steering knuckles 36 and 38 at the wheels.

The steering gears of rack 24 and pinion 34 converts the turning of the steering wheel to a side-to-side movement of the steering linkage. Accordingly, the steering knuckles 36 and 38 connected to the ends of the tie rods 30 and 32 perform the steering operation of the driving wheels.

In this steering linkage configuration, since the steering stroke adjusting means symmetrically arranged at both ends of the steering gear box have the same structure, only the left steering stroke adjusting means will be described.

Figure 3:
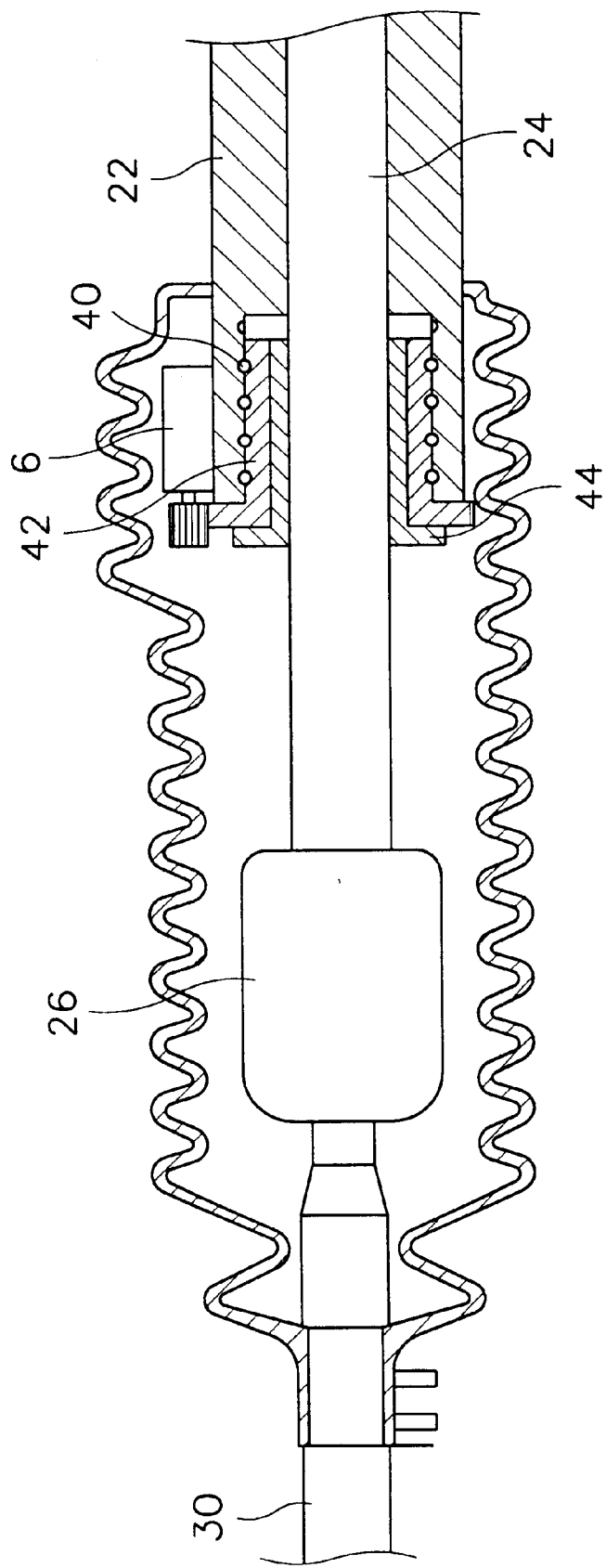
FIG. 3 an enlarged front view showing a steering stroke adjusting means of the steering linkage of FIG. 2.

With reference to FIG. 3, the steering stroke adjusting means 3 includes a rack stopper 42 (secured in an opening formed at the outer end of the cylinder 22 by means of a ball screw assembly) and an actuator 6 for actuating the rack stopper 42.

Since the rack stopper 42 is secured by means of a ball screw, the rack stopper 42 can reciprocally move according to the rotational direction of the rack stopper 42.

Thus, when the actuator 6 generates a rotational force according to a control signal from the ECU 4, the rotational force is transmitted to the rack stopper 42 by gear engagement such that the rack stopper 42 moves along the rack 24.

Both the rack stoppers 42 are designed in such a way that the rack stoppers 42 move in directions opposite to each other, that is, the rack stoppers both move toward the center of the steering gear box, or toward the direction of opposite wheels at the same time.

Since the rack stopper 42 is variably positioned along the rack 24, the position of the rack stopper 42 determines the steering stroke range of the vehicle.

Between the rack 24 and rack stopper 42, a bushing 44 is interposed for reducing a friction force being generated therebetween. The bushing 44 is preferably made of a material having high lubrication qualities and durability.

Figure 4:
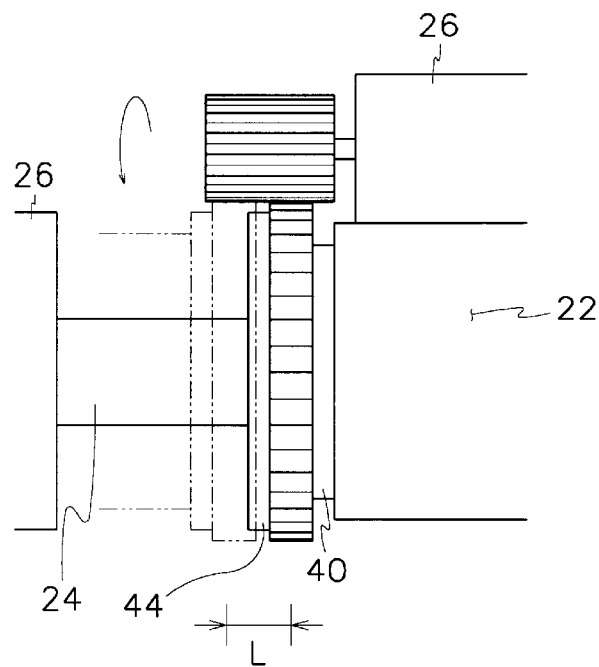
FIG. 4 is a drawing showing an operation of the steering stroke adjusting means according to the first preferred embodiment of the present invention.

A moving distance "L" of the rack stopper 42 represented in FIGS. 2 and 4 is determined in accordance with the vehicle's load condition, and the position of the rack stopper 42 is continuously varies by the actuator 6 controlled by the ECU 4 without range stages.

Figure 6:
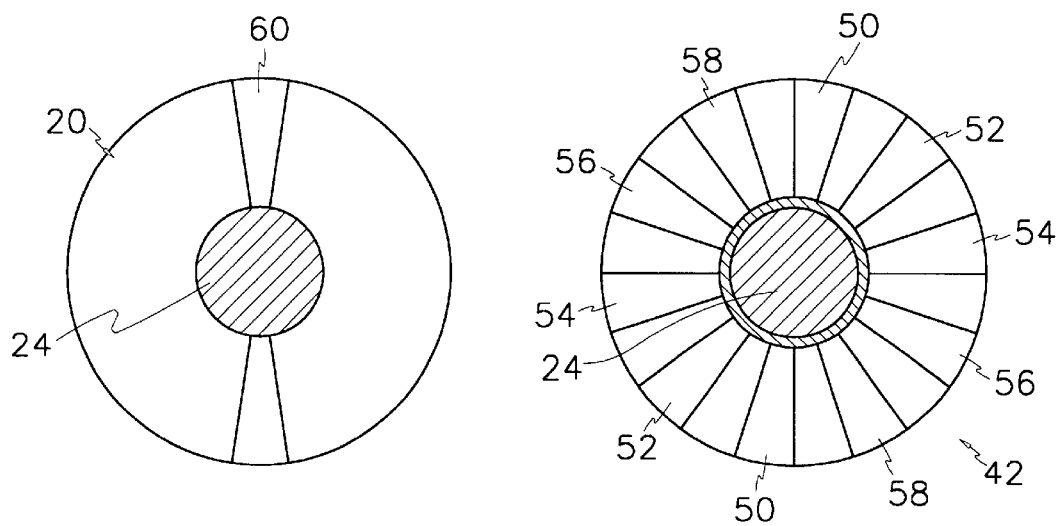
FIG. 6 is a front view showing a rotation member and a support member of the steering stroke adjuster of FIG. 5.
Figure 5:
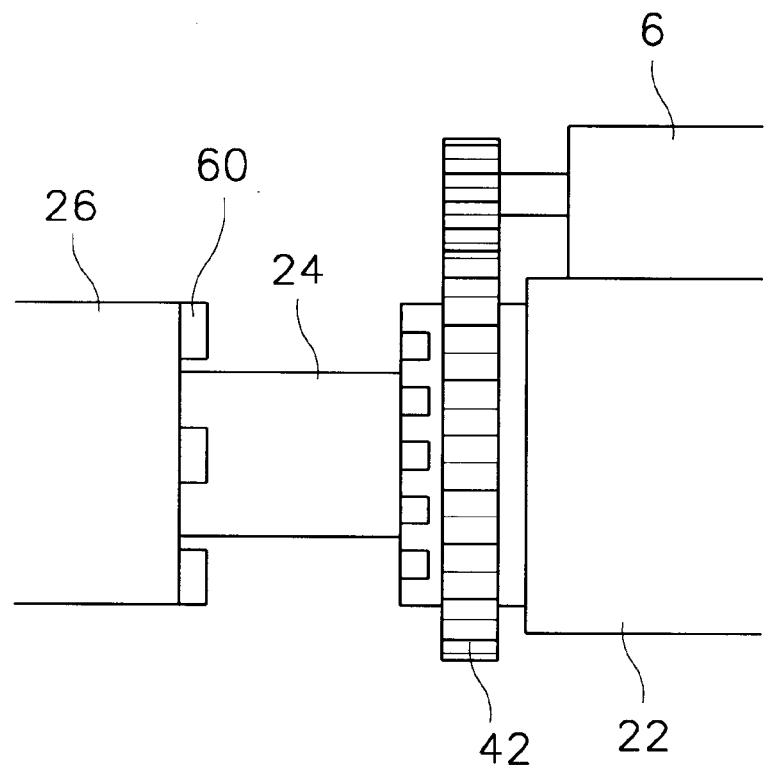
FIG. 5 is a front view showing another steering stroke adjuster according to a second preferred embodiment of the present invention.
Figure 7:
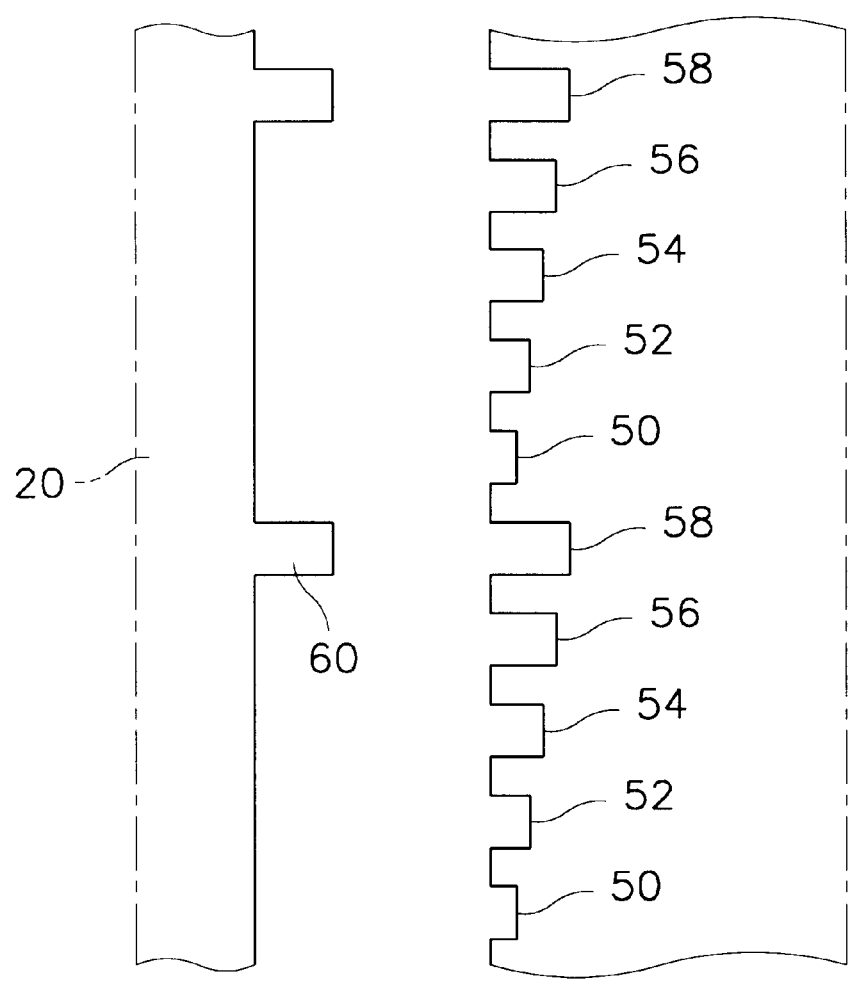
FIG. 7 is a projection of the circumferencial surfaces of the rotation member and the support member of FIG. 6.

FIGS. 5, 6 and 7 shows another steering stroke adjusting means according to a second preferred embodiment of the present invention.

In the second embodiment, the rack stopper 42 is designed in such a way that the surface of the rack stopper 42 which faces the ball joint 26 is symmetrically divided into two half areas and each half area is indented to have five recesses 50, 52, 4, 5, and 58, which are formed at uniform intervals. These recesses are also formed with varying depths, getting deeper from the first recess 50 to fifth recess 58, with the two recesses formed oppositely in both half areas having the same depth (this is represented in projections of the circumferential surfaces in FIG. 7). Furthermore, the ball joint is designed in such a way that the surface of the ball joint which faces the rack stopper 42 has two oppositely formed projections 60, with each projection 60 being formed to have a shape and a length which can be received into and fit into the fifth recess 58 of the rack stopper 42.

Thus, the steering stroke range of the vehicle is defined by into which recesses of the rack stopper 42 the projections 60 are received. That is, if the projections 60 are received into the first recesses 50, the steering stroke range is maximal, and if the projections 60 are received into the fifth recesses 58, the steering stroke range is minimal.

In this second preferred embodiment, 5 pairs of recesses are disclosed. However, the number of the recesses are not limited but can be increased as needed.

The steering stroke range of the vehicle is defined by the moving distance of the rack stopper in the first preferred embodiment, and by the depth of the recesses in which the projections is received the second preferred embodiment, such that the maximal steering angle range (θ) can be adjusted by changing the steering stroke range of the steering linkage (see FIG. 2).

As described above, since the maximal steering stroke range is variably set according to a wheel bouncing level estimated on the basis of parameters detected by the high sensor at the start of travel, the vehicle can turn in an optimal minimal turning radius according to the vehicle's load condition.

While this invention has been described in connection with what is presently considered to be the most practical and preferred embodiment, it is to be understood that the invention is not limited to the disclosed embodiments. On the contrary, this invention is intended to cover various modifications and equivalent arrangements included within the spirit and scope of the appended claims.

What is claimed is:

1. An automotive minimal turning radius control system comprising:

means for sensing a height of a vehicle body for estimating wheel bounce according to a load condition;

a pair of actuators which are controlled by an Electric Control Unit according to a height of the vehicle; and means for adjusting a maximum steering stroke, the means for adjusting being actuated by the actuators.

2. An automotive minimal turning radius control system of claim 1 wherein the means for sensing comprises a high sensor for sensing a height of the vehicle and responsively producing and sending a height signal to the Electric Control Unit such that the ECU can control the actuators.

3. An automotive minimal turning radius control system of claim 1 wherein the means for sensing comprises a manual switch which is manually operated for producing and sending a height signal to the Electric Control Unit.

4. An automotive minimal turning radius control system of claim 1 wherein each actuator comprises a motor.

5. An automotive minimal turning radius control system of claim 1 wherein means for adjusting comprises a pair of stroke adjusters each comprising:

a rack stopper secured in an opening formed at an outer end of a cylinder by interposing a ball screw assembly between the rack stopper and an inner surface of the opening; and a ball joint for limiting movement of the rack stopper.

6. An automotive minimal turning radius control system of claim 5 further comprising a lubricator interposed between the rack stopper and a rack.

7. An automotive minimal turning radius control system of claim 1 wherein the means for adjusting comprises a rack stopper which only rotates without reciprocating movement for adjusting an available rack stroke.

8. An automotive minimal turning radius control system of claim 7 further comprises a lubricator interposed between the rack and rack stopper.

9. An automotive minimal turning radius control system of claim 7 wherein an outer end surface of the rack stopper is divided into two half areas wherein each half area has a plurality of recesses which are formed at the same interval from each other, and that which formed successively deeper going from a first recess to a last recess, and wherein two recesses formed oppositely to each other, one in each of the half areas have the same depth, and wherein a surface of a ball joint which faces the rack stopper has two oppositely formed projections, each projection being formed having a shape and dimension which can be received completely into the last recess of the rack stopper.

10. An automotive minimal turning radius control system of claim 9 wherein the recesses are formed in 5 stages of depths.

11. An automotive minimal turning radius control system for vehicles comprising:

means for sensing a present height of a vehicle body, responsively producing and sending a height signal to an Electric Control Unit such that the electric control unit can determine the vehicle's load condition;

a pair of actuators each comprising a motor which is controlled according to a height of the vehicle; and a pair of steering stroke adjusters each comprising a rack stopper selectively reciprocating in accordance with a rotational direction of an actuator along a rack, and a ball joint which connects an outer end of a rack to an inner end of a tie rod limiting the reciprocating movement of the rack stopper.

12. An automotive minimal turning radius control system for vehicles comprising:

means for sensing a present height of a vehicle body, responsively producing and sending a height signal to an Electric Control Unit such that the electric control unit can determine the vehicle's load condition;

a pair of actuators each comprising a motor which is controlled according to a height of the vehicle; and a pair of steering stroke adjusters each comprising a rack stopper which only rotates without reciprocating for adjusting an available rack stroke, and a ball joint which connects an outer end of a rack to an inner end of a tie rod limiting the reciprocating movement of the rack stopper.

13. An automotive minimal turning radius control system of claim 12 wherein an outer surface of the rack stopper is divided into two half areas wherein each half area has a plurality of recesses which are formed in a same interval from each other, and which are formed successively deeper going from a first recess to a last recess, and wherein two recesses formed oppositely to each other, one in each of the half areas have the same depth, and wherein a surface of the ball joint which faces the rack stopper has two oppositely formed projectors, each projection being formed having a shape and dimension which can be received completely into the last recesses of the rack stopper.

14. An automotive minimal turning radius control system of claim 13 wherein the recesses are formed in 5 stages of depths.

15. An automotive minimal turning radius control system comprising:

means for sensing a height of a vehicle body comprising a manual switch which is manually operated for producing and sending a height signal to the Electric Control Unit;

a pair of actuators which are controlled by an electric control unit according to a height of the vehicle; and means adjusting a steering stroke, the means for adjusting being actuated by the actuators for adjusting the steering stroke.

16. An automotive minimal turning radius control system comprising:

means for sensing a height of a vehicle body;

a pair of actuators which are controlled by an Electric Control Unit according to a height of the vehicle; and a pair of stroke adjusters adjusting a steering stroke, the stroke adjusters being actuated by the actuators for adjusting the steering stroke, each stroke adjuster comprising, a rack stopper secured in an opening formed at an outer end of a cylinder by interposing a ball screw assembly between the rack stopper and an inner surface of the opening, the rack stopper moveable relative to a steering rack, and a ball joint for limiting movement of the rack stopper.

17. An automotive minimal turning radius control system of claim 16 further comprising a lubricator interposed between the rack stopper and the rack.

18. An automotive minimal turning radius control system comprising:

means for sensing a height of a vehicle body;

a pair of actuators which are controlled by an Electric Control Unit according to a height of the vehicle; and rack stopper moveable relative to a steering rack for adjusting an available steering stroke, the rack stopper being actuated by one of said actuators for adjusting the available steering stroke, wherein the rack stopper only rotates without reciprocating for adjusting the available steering stroke.

19. An automotive minimal turning radius control system of claim 18 further comprising a lubricator interposed between the rack and the rack stopper.

20. An automotive minimal turning radius control system of claim 7 wherein an outer surface of the rack stopper is divided into two half areas, wherein each half area comprises a plurality of recesses which are spaced apart from each other by the same interval and which are successively deeper from a first recess to a last recess, wherein a recess having a first depth in one half area is formed opposite a recess in the other half area having a second depth equal to the first depth, wherein a surface of a ball joint facing the rack stopper comprises two oppositely formed projections, each projection having a shape and dimension for being received completely into a last recess of the rack stopper.

21. An automotive minimal turning radius control system of claim 20 wherein each half area comprises five recesses.

* * * * *